July 21, 1942.  E. R. DETRICK  2,290,418
TRIM PANEL
Filed Dec. 9, 1940  2 Sheets-Sheet 1
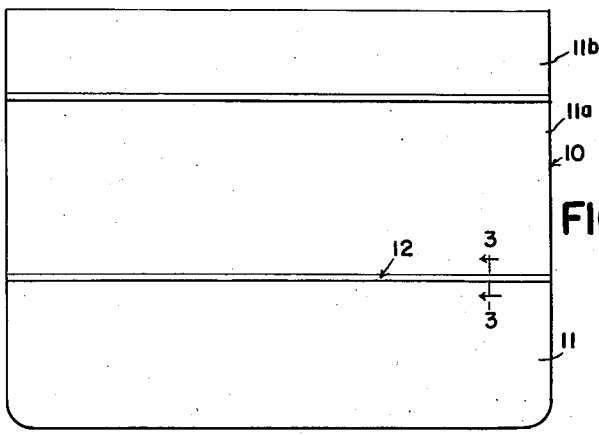
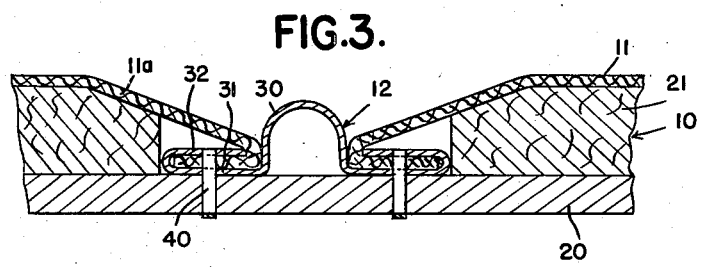
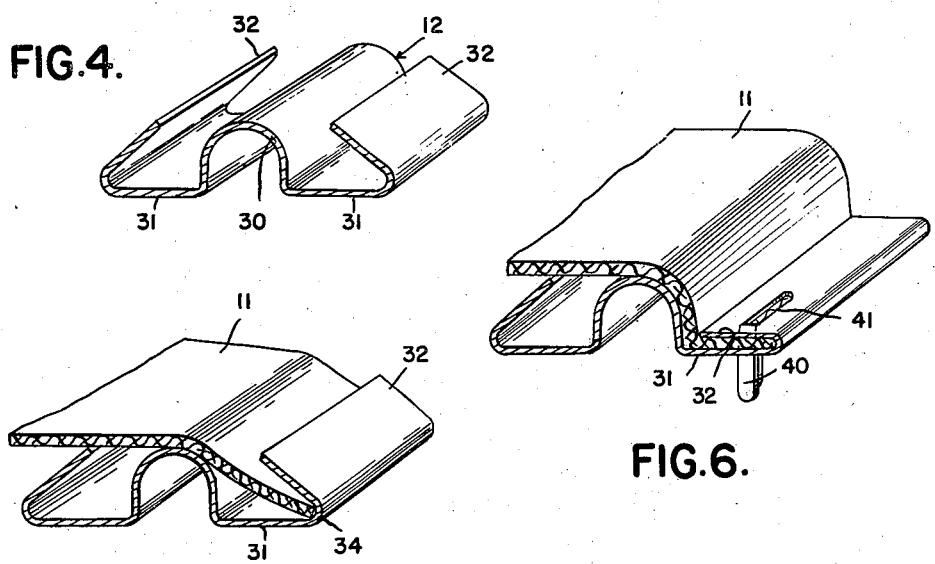
INVENTOR.
EDWARD R. DETRICK
BY Whittemore, Hulbert
& Belknap  ATTORNEYS July 21, 1942.  E. R. DETRICK  2,290,418
TRIM PANEL
Filed Dec. 9, 1940  2 Sheets-Sheet 2

*INVENTOR.*
EDWARD R. DETRICK
BY Whittemore, Hulbert
& Belknap ATTORNEYS

Patented July 21, 1942

2,290,418

UNITED STATES PATENT OFFICE 2,290,418

TRIM PANEL

Edward R. Detrick, Detroit, Mich., assignor to National Automotive Fibres, Inc., Detroit, Mich., a corporation of Delaware Application December 9, 1940, Serial No. 369,306

13 Claims. (Cl. 45—138)

The present invention relates to trim panels and more particularly to a trim panel having a molding strip of unique design. The present application is a continuation in part of my prior copending application, Serial No. 348,291, "Trim panel," filed July 29, 1940. In my prior copending application I disclose trim panels employing molding strips, preferably formed of light gauge sheet metal having a bead extending longitudinally thereof and having laterally extending flanges having backwardly bent portions beneath which the free edges of trim fabrics are clinched. I disclosed the assembly of these molding strips together with the trim fabric thus clinched thereto by the use of staples or the like extending through the flanges and panel board.

I have now found that substantially improved results may be obtained when the molding strips are provided with integral attaching elements which may be formed from the flanges of the molding strip in some manner. In the present application I have illustrated two specific embodiments of my invention.

It is accordingly an object of the present invention to provide a trim panel having a molding strip of the character described to which are secured separate pieces of trim fabric, the molding strip having integral elements for attachment thereby to the trim panel.

It is a further object of the invention to provide a molding strip having a flange extending laterally therefrom, provided with a portion adapted to be bent backwardly upon itself to clinch a free edge of a trim fabric therebeneath, the flange having struck-out elongated portions bent downwardly to form attaching elements.

More specifically it is an object of the invention to provide a molding strip of the type aforesaid having portions struck-out from a flange thereof at a point spaced inwardly from the bent portion of the flange so as to provide an integral attaching structure consisting of two independently bendable projections.

It is a further object of the present invention, in a molding strip of the type described, to provide a projection for attaching the molding strip to a panel board by striking-out a portion of the flange at its bent portion.

It is a further object of the present invention to provide for a positive interlock between the edges of the fabric and a bent flange of the molding strip by striking-out elongated portions of the flange of the molding strip in a manner to form an attaching projection thereon.

Other objects of the invention will be apparent as the description proceeds, and when taken in conjunction with the accompanying drawings, wherein:

Figure 1 is a front elevation of a trim panel embodying the present invention;

Figure 2 is a side elevation of the trim panel shown in Figure 1;

Figure 3 is a fragmentary section on the line 3—3, Figure 1, on a greatly enlarged scale;

Figure 4 is a fragmentary sectioned perspective of the molding strip employed in accordance with the present invention;

Figure 5 is a view similar to Figure 4, illustrating the first step in the assembly of the molding strip with a trim fabric;

Figure 6 is a view similar to Figure 4, illustrating the next succeeding step in the assembly of the molding strip with a trim panel;

Figure 7:
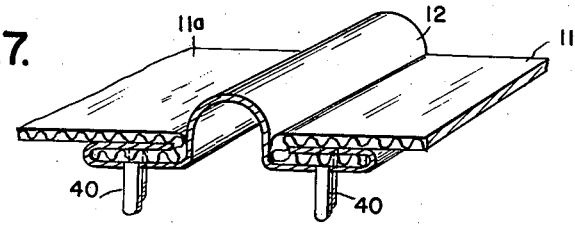
Figure 7 is a view similar to Figure 4, illustrating the complete assembly of the molding strip with a pair of trim fabrics.

Referring first to Figures 1 and 2, I have indicated at 10 the trim panel which is covered with separate pieces of trim fabric 11, 11a and 11b, and which has assembled therewith decorative molding strips 12. The fabrics 11a and 11b may if desired be of contrasting or harmonizing colors. In like manner the fabric may be of entirely different materials, as for example the lowermost fabric 11 may if desired be a scuff resisting material, such for example as leather or artificial leather.

In Figure 3 I have indicated on a greatly enlarged scale the detailed structure. In this figure the trim panel 10 comprises a panel board 20, which may be formed of an asphalt board if desired. Mounted on the panel board 20 and adapted to give it a rich padded appearance is padding material 21, which may take the form of cotton, jute or other fibrous material. The padding material 21 is preferably omitted from the panel board at the zones along which the molding strips 12 are to extend. The padding material may be applied in any desired manner, as for example it may be die cut to predetermined pattern and adhesively mounted on the panel board 20. If preferred, it may be applied uniformly over the entire surface of the panel board 20, after which it may be routed away from the zones which will underlie the molding strips 12 in the completed article.

In Figure 3 I have indicated portions of the trim fabrics 11 and 11a as secured directly to the molding strip 12 by a detailed arrangement which will now be described. The molding strip 12 comprises a central bead 30 and laterally extending flanges 31, including rearwardly bent flange portions 32. The edges of the trim fabrics 11 and 11a are located beneath the reversely bent flange potrion 32 and are clamped in place thereby. As a result, the trim fabrics are permanently secured to the molding strip 12 and their attachment to the panel board 20 at this point is accomplished by means of fastening elements 40 which are formed integrally with the flanges 31, including the rebent flange portions 32.

The exact arrangement of the molding strip 12 will be more apparent from a consideration of Figures 4 to 10, illustrating in part the method of assembly of the molding strips with the fabrics.

In Figure 4 I have indicated a portion of the molding strip 12, including the bead portion 30 and the flanges 31 with the portions 32, which in the completed article are bent so as to extend along the flange portions 31 and to clamp the fabric edges therebetween.

In Figure 5 the first step in the assembly of the product is illustrated. In this figure a fabric 11 has a free edge introduced beneath the flange portion 32 so as to extend substantially to the bend 34 which joins the flange portions 31 and 32.

The next step in the operation is illustrated in Figure 6 wherein I have shown the flange portion 32 as bent downwardly so as to clamp the free edge of the fabric 11 therebeneath and between the flange portions 32 and 31.

The operation illustrated in Figure 6 is preferably carried out in a power press so that the flange portion 32 is bent downwardly with considerable force. However, it will be appreciated that the strength with which the edge of the fabric 11 is retained between the flange portions 31 and 32 will depend in large part upon the gauge of the metal, and accordingly it is desirable to insure a positive interlock which will retain the edge of the fabric 11 in assembled position. At the same time it is desirable to provide finishing elements which may engage the trim panel in subsequent operations. For a number of reasons it is also desirable in many cases to provide fastening elements which may be inserted freely through pre-cut openings in the trim panel and clinched on the back thereof. It will be appreciated that fastening elements of the type requiring a blow or the application of a force to cause them to penetrate the trim panel would be unsatisfactory since the blow or application of force referred to would have to be applied through the trim fabric. This consideration is not always true, however, and in some cases it is permissible to form the attaching elements as a pointed projection which may be driven through the panel board.

In Figure 6, however, I have illustrated the type of attaching device 40 intended to be inserted through previously formed registering openings in the trim panel. The attaching device indicated generally at 40 is formed by striking-out the elongated portions thereof from the flange portions 31 and 32 and bending them so they project downwardly as indicated in this figure. This, of course, leaves openings 41 in the flange but these openings are covered by the fabric 11 in the completely assembled article, as will be apparent from an inspection of Figure 3.

If desired, the bending down of the flange portion 32 and the striking-out of the elements 40 may take place as separate operations, but for convenience it is desirable to equip a press with a die-cutting portion for striking-out the elements 40 and bending them inwardly simultaneously with the bending of the flange portions 32.

In Figure 7 I have indicated the next step in the assembly of the molding strip 12 with the fabrics, and in this figure I have indicated the strip 12 as completely assembled with two fabrics, 11 and 11a and the attaching elements 40 formed at both flanges of the molding strip 12.

Figure 8:
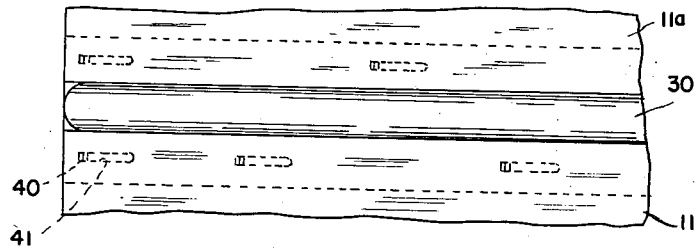
Figure 8 is a fragmentary elevation of a trim panel on an enlarged scale.

Figure 8 is a fragmentary plan view of a portion of the assembled panel, and in this figure I have indicated the bead 30 of the molding strip and I have shown a preferred arrangement and spacing of the attaching elements 40. The elongated openings 41 which result from striking-out the attaching elements 40 is also indicated. Fabrics, such for example as fabric 11 and 11a, are also shown. It will be observed that attaching elements 40 are located in each flange adjacent one end thereof, and throughout the intermediate portion of the flange the attaching elements 40 are arranged in staggered relation.

Figure 9:
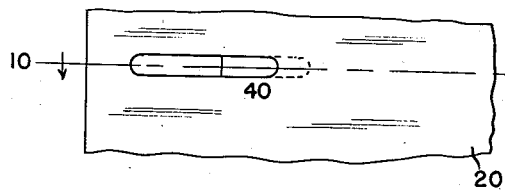
Figure 9 is a fragmentary bottom plan view of a portion of a completed trim panel on an enlarged scale.

Figure 9 is a bottom plan view of the assembled panel and shows the attaching elements 40 bent away from each other to provide a secure interlock between the molding strip and the panel board 20.

Figure 10:
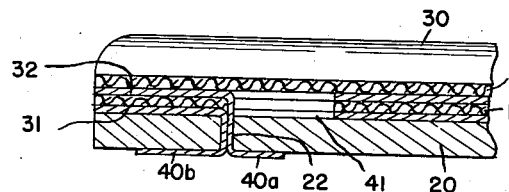
Figure 10 is a section on the line 10—10, Figure 9.

Figure 10 is a section on the line 10—10, Figure 9 and shows the relationship of parts in the completely assembled panel. In this figure the panel board 20 is provided with an opening 22. The bead 30 of the molding strip is shown, and the section passes through the flange, thus illustrating the relationship between the lower flange portion 31 and the upper or backwardly bent flange portion 32. The trim fabric 11 is indicated, and its lower free edge which is received between the flange portions 31 and 32 and clamped in place thereby is indicated at 11'. The attaching elements 40 are separately shown in this figure as comprising a first element 40a which is struck downwardly from the flange portion 32, and a second element 40b which is struck downwardly from the flange portion 32. The openings 41 which result from striking down the fastening elements 40a and 40b are also shown in this figure. It will be appreciated that the fastening element 40a which is struck downwardly from the upper portion 32 penetrates the edge 11a of the fabric 11 and securely locks the same in assembled relation with the molding strip. It will also be apparent that the fabrics are secured directly to the molding strip at this point and are not secured to the trim panel. The molding strip 12 is secured directly to the trim panel and the fabrics are interlocked with the trim panel through the medium of the molding strip 12.

Figure 11:
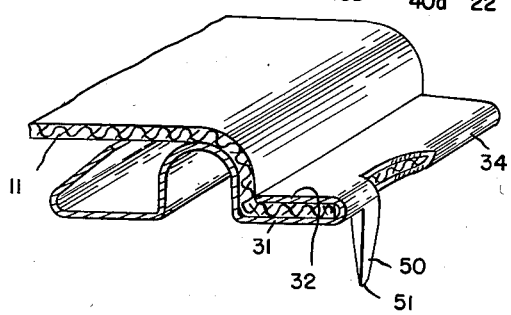
Figure 11 is a section fragmentary perspective illustrating a modified form of my invention.

In Figure 11 I have illustrated a similar but specifically different embodiment of my invention, which differs from the embodiment illustrated in Figure 6 in that the attaching element 50 of Figure 11 is struck outwardly from the bent edge 34, interconnecting the flange portions 31 and 32. As a result, the element 50 is a single element as opposed to the double elements, comprising elements 40a and 40b, best illustrated in Figure 10. Preferably the attaching element 50 is formed so as to be provided with a sharp point 51 which may be driven or pressed through the panel board 20 without previous provision of an opening therefor. This type of molding strip may conveniently be employed where the molding strip is to be attached to a panel board before the trim fabric carried thereby is bent backwardly so as to overlie the attaching flange.

In the embodiment illustrated in Figure 11 the element 50 is preferably struck-out to a depth measured inwardly from the bent edge 34 sufficient to include a portion of the fabric 11 so as to provide a positive interlock between the fabric and the molding strip.

Figure 12:
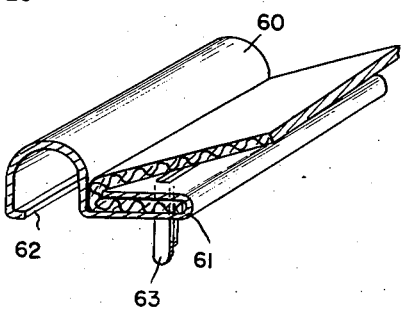
Figure 12 is a section fragmentary perspective of yet another modification of my invention.

In some cases it is unnecessary to provide attaching flanges at both edges of the bead, and such an arrangement is illustrated in Figure 12 in which I have shown a bead portion 60 having a flange indicated generally at 61 at one side thereof. At the other side of the bead 60 no flange is provided, and preferably the free edge of the bead 60 is bent inwardly to provide a finished appearance and increased stiffness as indicated at 62. In this figure I have indicated a double attaching element 63 which is identical with that shown at 40 in Figure 7.

In the manufacture of the panels the separate pieces of trim fabric are permanently interlocked with the molding strip as indicated in the sequential Figures 4 to 7. After this the assembly comprising the molding strip 12 and fabrics 11, 11a or 11b may be attached to the panel board in any convenient manner. Thus, for example, the panel board may be initially provided with a series of openings, such as 22, for the reception of the fastening elements 40. If this is the case, the fastening elements 40 are merely inserted through these openings and the elements 40a and 40b thereof are bent away from each other as indicated in Figure 10. The trim fabric may then be drawn tightly over the padding material 21 and adhered to the edges of the trim panel. This insures proper location of the molding strip, which is the outstanding feature of the design of the completed trim panel.

In the event that molding strips of the type illustrated in Figure 11 are employed, the molding strip may be placed on the panel board in the desired position, and a blow or pressure may be applied thereto to force the sharp pointed attaching elements 50 to penetrate the panel board and to be clinched onto the reverse side thereof.

It will be observed that molding strips of the type illustrated in Figure 3 may be assembled on the panel board by a somewhat different method in that the edges of the fabric may be secured to the panel board first, after which the attaching elements 40 may be slipped through openings 22 in the trim panel and bent into interlocked position. Since no appreciable pressure need be applied to the flanges during this operation, it may, if desired, be carried out after the edges of the fabric have been adhered or otherwise secured adjacent the edges of the trim panel.

From the foregoing it will be seen that my improved construction provides two substantial advantages over the construction illustrated in my copending application previously identified. The provision of the integral projections serves the dual function of positively interlocking the edge of the fabric and the molding strip and also provides means for attaching the molding strip to the panel board.

While I have illustrated a number of specific embodiments of molding strips, it will be understood that the same has been done merely to enable those skilled in the art to practice the invention, the scope of which is indicated by the appended claims.

What I claim as my invention is:

1. A trim panel comprising a panel board, a fabric cover therefor including a plurality of pieces of fabric, a metal strip on said panel board, means on said strip for clampingly engaging edges of said pieces of fabric to said strip, fastening means integral with said strip penetrating said fabric and engaging said panel board, whereby said edges of said fabric are secured directly to said strip and said strip is secured directly to said panel board.

2. A trim panel comprising a panel board, a molding strip having a bead provided with a laterally extending sheet metal flange, said flange having a portion bent upon itself, a fabric cover for said board having a free edge clamped between said flange and the bent portion thereof, fastening elements integral with said flange comprising struck-out portions of said flange and its bent portion, said fastening elements locking the fabric in place and extending through said panel board to assemble the molding strip on said panel board.

3. A trim panel comprising a panel board, a molding strip having a bead provided with a laterally extending sheet metal flange, said flange having a portion bent upon itself, a fabric cover for said board having a free edge clamped between said flange and the bent portion thereof, fastening elements integral with said flange comprising struck-out portions of said flange and its bent portion, said fastening elements locking the fabric in place and extending through said panel board to assemble the molding strip on said panel board, said fastening elements being spaced inwardly from the bent edge of said flange.

4. A trim panel comprising a panel board, a molding strip having a bead provided with a laterally extending sheet metal flange, said flange having a portion bent upon itself, a fabric cover for said board having a free edge clamped between said flange and the bent portion thereof, fastening elements integral with said flange comprising struck-out portions of said flange and its bent portion, said fastening elements locking the fabric in place and extending through said panel board to assemble the molding strip on said panel board, said fastening elements being struck out of the bent edge of said flange.

5. A sub-assembly for attachment to a panel board comprising a sheet metal molding having a central bead and lateral flanges, said flanges having outwardly extending portions and portions bent backwardly upon said outwardly extending portions, fabrics having edges concealed beneath and clamped by said bent portions to said outwardly extending portions, and fastening elements struck out of said flanges including said bent portions, said fastening elements interlocking said fabrics in place.

6. A sub-assembly for attachment to a panel board comprising a sheet metal molding having a central bead and lateral flanges, said flanges having portions bent backwardly upon themselves, fabrics having edges concealed beneath and clamped by said bent portions, and fastening elements struck out of said flanges including said bent portions, said fastening elements interlocking said fabrics in place, said fastening elements being spaced inwardly from the bent edge of said flanges so as to provide a pair of contiguous elements.

7. A sub-assembly for attachment to a panel board comprising a sheet metal molding having a central bead and lateral flanges, said flanges having portions bent backwardly upon themselves, fabrics having edges concealed beneath and clamped by said bent portions, and fastening elements struck out of said flanges including said bent portions, said fastening elements interlocking said fabrics in place, said fastening elements being struck out of the bent edge of said flanges whereby each comprises a bent, double thickness of metal.

8. In a method of making trim panels, the sub-assembly of trim fabrics and a molding strip for attachment to a panel board which comprises: providing a molding strip having a laterally extending sheet metal flange, positioning an edge of a trim fabric on said flange, bending the free edge of said flange inwardly and downwardly so as to clamp the edge of said fabric between the flange proper and its bent edge portion, and simultaneously striking out elongated portions of said flange and its bent portion, and bending said struck-out portions downwardly to provide fastening elements.

9. A trim panel comprising a panel board, a molding strip having a bead and an attaching flange having a reversely bent portion, said flange having fastening elements integral therewith projecting therefrom through said panel board, said fastening elements being struck-out portions of said flange and its reversely bent portion, a piece of cover fabric at one side of said strip secured to said panel board at an edge and having a free edge adjacent said strip, the free edge of said fabric being folded under the reversely bent portion of said flange, the fold of said fabric being in substantial abutment with said bead.

10. A trim panel comprising a panel board, a molding strip having a bead and an attaching flange having a reversely bent portion, a trim fabric having an edge clamped beneath said reversely bent portion, said flange having fastening elements integral therewith projecting therefrom through said panel board, said fastening elements being portions of said flange including its reversely bent portion struck out after assembly with said fabric, said fabric being thereby positively interlocked in said flange.

11. A trim panel comprising a panel board, a metal strip provided with laterally extending sheet metal flanges, said flanges having reversely bent portions, cover fabric for said board having free edges folded under said reversely bent portions and clamped thereby between said reversely bent portions and said flanges, fastening elements integral with said flanges comprising struck out portions of said flanges and their bent portions, said fastening elements locking the fabric in place and extending through said panel board to assemble the molding strip on said panel board, said reversely bent portions of said flanges being spaced apart sufficient to provide a substantial space between the folded edges of said fabrics.

12. A trim panel comprising a panel board, a piece of trim fabric tensioned over said panel board and secured at one of its edges to said panel board, a metal strip on said panel board, said strip having a flat portion the edge of which is reversely bent to form a U-shaped structure whose open side is away from the said one edge of said piece of trim fabric, said piece of trim fabric extending over said reversely bent edge of said strip and folded underneath said reversely bent edge so as to extend into the open side of said U-shaped structure, said reversely bent edge of said strip being in firm, gripping engagement with the folded portion of said trim fabric, and fastening prongs struck out of both walls of said U-shaped structure and penetrating the fold of said trim fabric therein to lock said trim material in place, said prongs securing said strip to said panel board.

13. A trim panel comprising a panel board, two pieces of trim fabric tensioned over said panel board and secured to said panel board at their outer edges, a metal strip on said panel board between said pieces of trim fabric, said strip having flat portions, the edges of said flat portions being reversely bent to define inwardly open U-shaped structures, said pieces of trim fabric each extending over the adjacent reversely bent edge and being folded under said reversely bent edge whereby the folded portion of said fabric extends into the open side of said U-shaped structure, said reversely bent edges of said strips being in firm, gripping engagement with the folded portions of said trim fabrics, and fastening prongs struck out of both walls of said U-shaped structures, said prongs penetrating said folds of trim fabric to lock said folds of trim fabric in place and securing said strip to said panel board.

EDWARD R. DETRICK.